Dec. 3, 1940.  J. G. HEASLET  2,223,802

FRONT END SUSPENSION FOR TRACK-LAYING TRACTORS

Filed May 24, 1938  3 Sheets-Sheet 1

INVENTOR
James G. Heaslet
BY George Douglas Jones
ATTORNEY

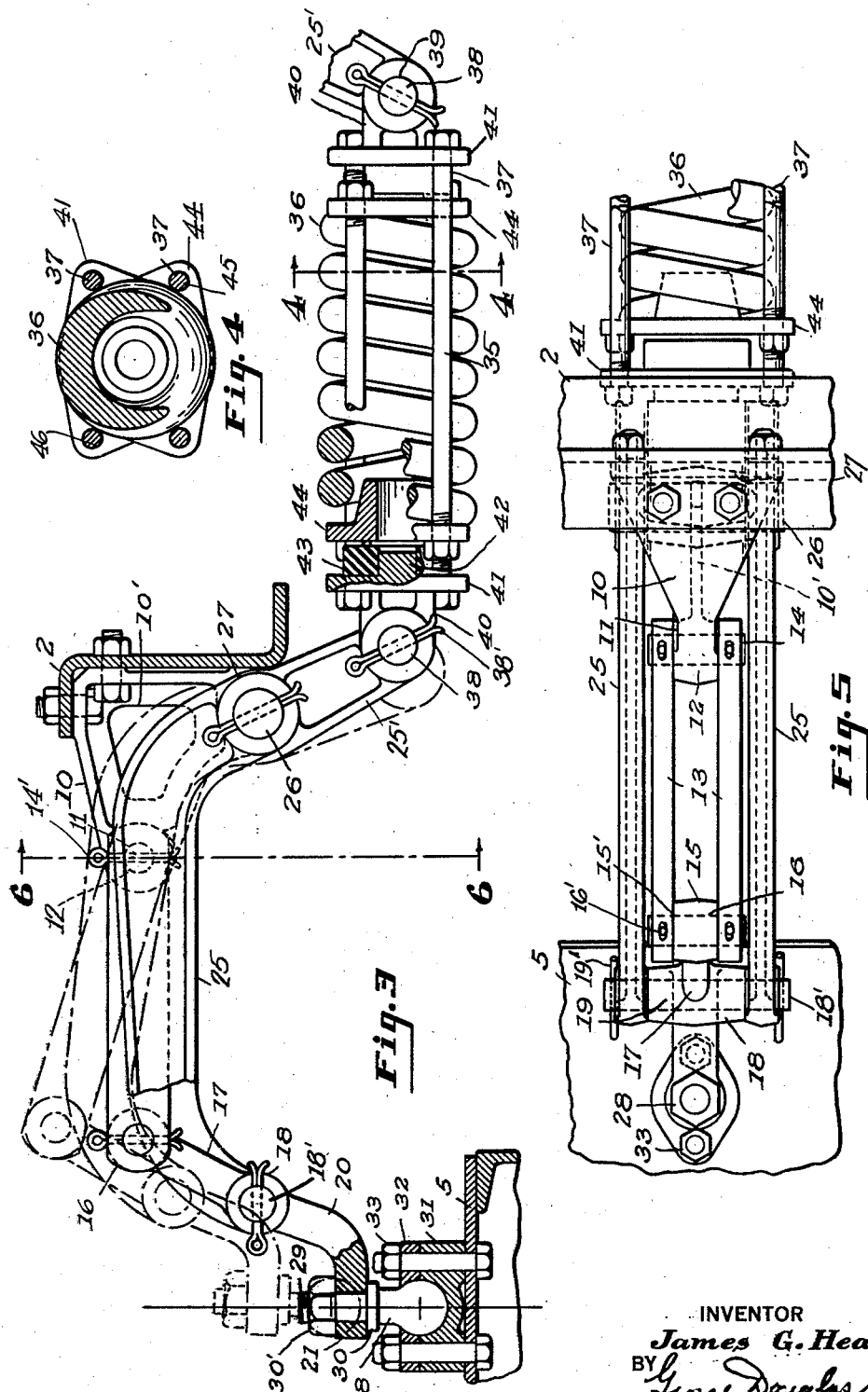

Dec. 3, 1940.   J. G. HEASLET   2,223,802
FRONT END SUSPENSION FOR TRACK-LAYING TRACTORS
Filed May 24, 1938   3 Sheets-Sheet 3
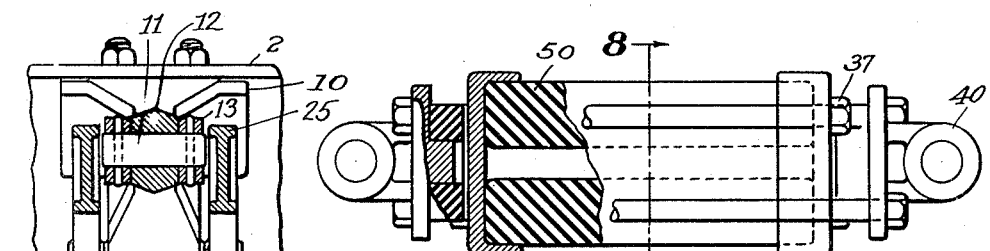
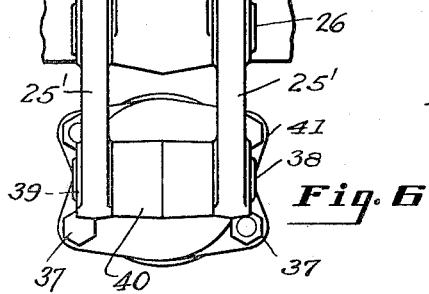
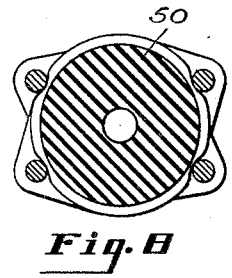
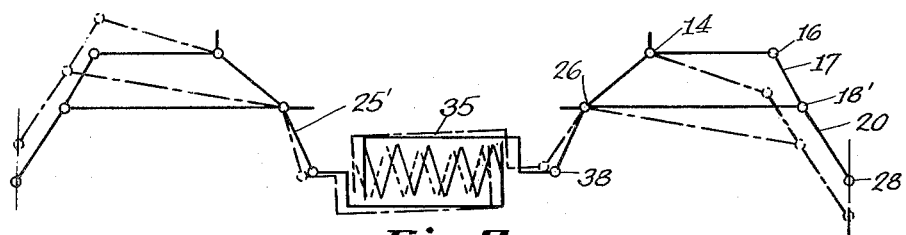
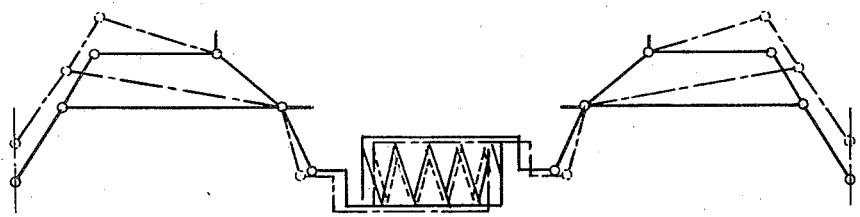
INVENTOR
James G. Heaslet
BY George Douglas Jones
ATTORNEY Patented Dec. 3, 1940

2,223,802

UNITED STATES PATENT OFFICE 2,223,802

FRONT END SUSPENSION FOR TRACK-LAYING TRACTORS

James G. Heaslet, Cleveland, Ohio, assignor to The Cleveland Tractor Company, Cleveland, Ohio Application May 24, 1938, Serial No. 209,819

7 Claims. (Cl. 180—9.1)

This invention relates to front end suspensions for crawler or track-laying tractors and more particularly to an improved front end suspension of the general type disclosed and claimed in my prior U. S. Letters Patent No. 2,064,747, patented December 15, 1936.

The present invention pertains to a suspension device for joining the forward portions of the crawler or track-laying side frames to the main frame or chassis of a tractor and the suspension is so constructed and arranged that the forward ends of the side frames are permitted free individual movement in a vertical plane while being restrained from any transverse or lateral movement.

Crawler tractors having endless ground engaging tracks generally receive their tractive power through sprockets driven by axles at the rearward sides of the tractor chassis, while the track chains are supported on side frames also pivoted to the rearward portions of the chassis. The front portions of the side frames conventionally carry idler wheels over which the track chains pass and customarily each side frame is secured to the front of the chassis frame and to each other by spring devices, links or the like. However, these structures prevent the front portions of the tracks from contacting the ground under certain conditions and, in traversing rough or uneven terrain, the tractor bumps along with portions of the track off the ground. Furthermore, all attempts to individually mount the track frames to secure individual vertical movement have lacked success, because the suspensions utilized have allowed the tracks to influence each other by reason of their spring or linkage connections, and, while "knee action" type automobile wheel mountings have been suggested, the idea has been abandoned as it would cause the tracks to move in an arcuate plane and not in a true vertical direction.

In the drawings:

Fig. 3 is an enlarged front view of one of the suspension assemblies, showing its relative movement in dotted lines;

Fig. 4 is a vertical cross-section taken on line 4—4 of Fig. 3;

Fig. 5 is a top plan view of one of the suspension assemblies;

Fig. 6 is a view partly in vertical cross-section taken on line 6—6 of Fig. 4 and in the direction of the arrows;

Fig. 7 is a modified compression member partly in cross-section for joining the suspension assemblies;

Fig. 8 is a vertical cross-section taken on line 8—8 of Fig. 7;

Figs. 9 and 10 are diagrammatic views illustrating the relative movement of the suspension assemblies when in use on a tractor.

Figure 1:
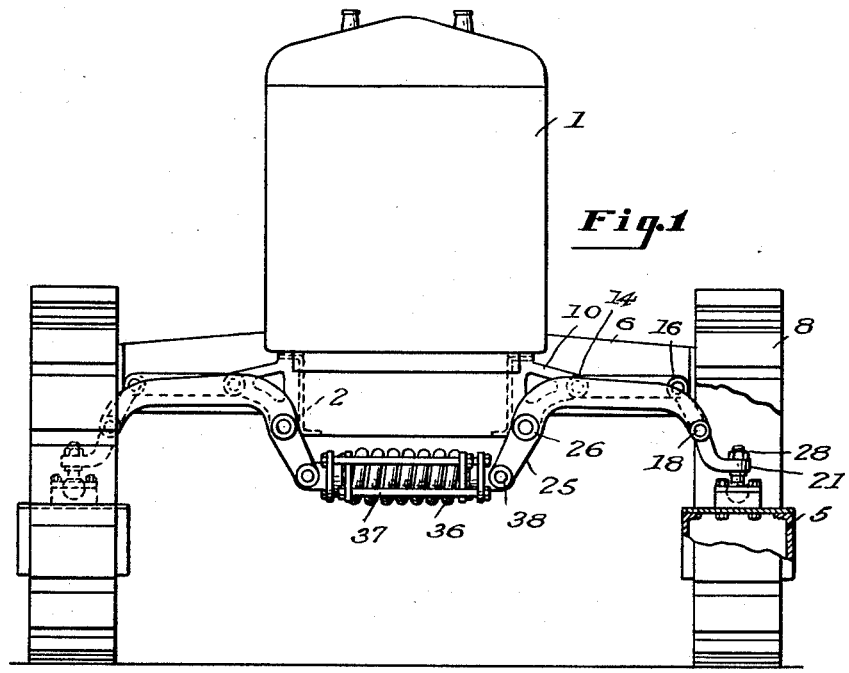
Fig. 1 is a front elevational view of a track-laying tractor, partly broken away, showing the point of attachment to the track frame.
Figure 2:
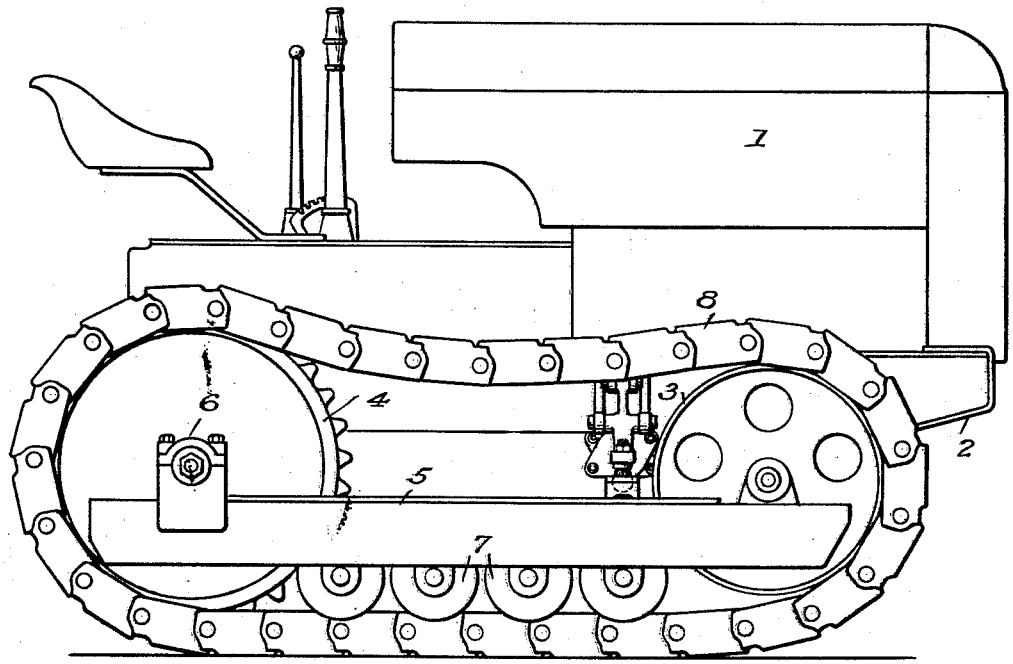
Fig. 2 is a side elevational view of the tractor.

The track-laying tractor is generally denoted by numeral 1, and, as is common in this type, consists of a rectangular chassis or motor frame 2, front idler sprockets 3, and rear track drive wheels 4 which are in turn journaled to side frames 5 ordinarily secured to rear axles 6.

Conventionally, the side frames carry load supporting rolls 7 bearing on the bottom edge of an articulated flexible track composed of a plurality of joined links 8.

Specifically, the present invention relates to the means of supporting the forward portions of the oppositely disposed tracks, so as to insure that the side frames 5 may oscillate about the rear axles 6 and thus each track will have independent movement of the other track and apply all of the tractive power to the ground over which the tractor is passing, regardless of whether or not the track assemblies are level or in elevated or depressed position. This independence of movement, while applying all of the power supplied by the tracks to the ground, is accomplished by a suspension linkage secured to opposite sides of the chassis frame 2 and extending to the forward portions of each of the pivoted side track frames 5.

Each suspension member consists of an offset outwardly extending, triangular shaped bracket 10 rigidly bolted or otherwise secured to the main frame. The bracket is preferably reinforced by means of a centrally disposed vertical web 10' extending from the lower edge of the bracket to the outward end thereof. An enlarged boss 12 is formed on the outer end of the bracket 10 and is provided with a horizontal aperture or bearing 11 therethrough for the reception of pivot pin 14.

A pair of parallel links 13 are mounted on the ends of the pivot pin 14 on either side of the apertured boss 12 and are retained in position by cotter pins 14'. The outer ends of the spaced parallel link members 13 are also apertured for the reception of pivot pin 16 which passes through the ends of the links and are secured thereto by cotter pins 16'. The links are spaced on opposite sides of a boss 15 having a bearing 15' therethrough for the reception of a pivot pin 16.

The boss 15 is formed on the upper end of depending pivoted lever 17 whose lower portion 20 is offset at 21 and, as shown in Fig. 3, the offset end portion 21 terminates in approximately the medial line of the top surface of the pivoted side frame 5.

The depending crank or lever 17 is also provided at approximately the middle of its length with an enlarged boss 18 having an aperture 19 therethrough and of a width somewhat greater than the length of pivot pin 16.

A pair of spaced arcuate levers 25 are pivotally mounted on a pin 26 positioned in bearing 27 formed in the lower part of the bracket 10, with the lower end portions 25' of the arcuate levers 25 joined by a pivoted pin 38 that passes through openings 39 therein. The spaced levers are retained on the end sections of the pins 38 by cotter pins 38'.

The outer ends of the arcuate levers 25 terminate beyond the ends of the parallel links 13 and are secured at opposite sides of the boss 18 to pivot pins 18' on which the boss is mounted. Cotter pins 19' pass through the end sections of the pivot pin 18' to secure the assembly together.

Referring now to the lower end 20 of the depending lever 17, it will be observed that a ball-headed bolt 28 is bolted through the vertical opening 29 in the end 20 of the lever 17 and retained therein by means of a flange 30 and nut 30'. The ball-headed portion 28 of the bolt depends below the end of arm 20 and is pivotally secured to the side frame 5 by means of a ball socket block 31 having a restricted opening cover plate 32. Bolts 33 passing through the side frame 5, socket block 31 and cover plate 32 firmly secure the assembly. It will be understood from this construction that the ball-headed bolt 28 is oscillatable within the socket formed in the socket block 31.

The two pairs of lower sections 25' of the arcuate levers depending from the opposite sides of the tractor chassis frame are joined by means of a resilient shock-absorbing connecting unit 35 pivotally secured to the levers by means of the pins 38 passing through the openings 39 of the levers 25' and the journals 40 formed on the end plates 41. These end plates have center lugs 42 on their faces around which are mounted resilient washers 43. A strong compression spring 36 lies between the end plates 41 and has bushings 44 mounted in the open ends thereof. These bushings are each provided with a pair of bolt openings 45 corresponding with complementary bolt openings 46 formed in the opposite end plates 41. When assembled, a pair of bolts 37 extend from each end plate 41 through the bushing 44 at the opposite end of the spring so that when either set of arcuate levers 25 are moved the spring 36 retards or brakes the movement by permitting the arcuate levers and their connections to compress the spring.

An alternate construction for the compression spring is shown in Fig. 7 where instead of using a compression spring, a cylinder of compressible material such as rubber is substituted. The action of the rubber is identical to that applied to the coil spring.

In operation, a crawler or track-laying tractor equipped with the present invention will move or crawl over rough terrain while maintaining its full power characteristics on each of the pivoted tracks, inasmuch as each track is independently supported from the tractor chassis frame and movement either up or down of either track does not effect the other track and, therefore, maintains the chassis in substantially horizontal position and on an even base at all times.

The diagrammatic Figs. 9 and 10 illustrate the position of the tractor front end suspension during movement of the tractor. In Fig. 9 the suspension linkage shown at the right in dotted lines is the position assumed when the track has dropped into a depression, while the dotted line position at the left of Fig. 9 shows the right hand track when this track has been elevated as in passing over an obstruction. In either instance the tractor as a whole remains substantially level, while its individual tracks move to take up the unevenness of the ground over which the machine is passing. Particular attention is called to the fact that in either up or down position the center of the ball 28 moves in a true vertical plane and thus restrains any tendency of outward or arcuate movement of the front of the track frame.

Fig. 10 shows the position of the linkage when both track frames have encountered an obstruction and have consequently been moved upwardly to dotted line position over their original position shown in solid lines. Here again the center of the ball 28 has moved upwardly in a true vertical plane to maintain the chassis in substantially horizontal or level position.

What I claim is:

1. A compound compensating linkage for front end support of the main frame of a crawler tractor to its rearwardly pivoted side frames, including linkage mechanism secured on opposite forward sides of the main frame and side frames, each of said linkage mechanisms including two spaced pairs of horizontally pivoted links and levers of unequal length, the outer ends of the two pairs of links and levers being pivoted to horizontally pivoted bell cranks having balls affixed to the lower ends thereof and adapted to cooperate with spherical sockets centrally mounted on the forward portion of the side frames, the said pair of levers being provided with an extension below their pivot point on the main frame and a common resilient means secured to the lower end of the said extensions.

2. In a crawler type tractor of the type having a main frame, side frames pivotally secured adjacent the rear ends of said main frame, endless track belts encircling said side frames, the improvement in having the forward ends of said side frames being solely connected to said main frame through a pair of laterally extending link units, each of said link units being horizontally pivoted intermediate their length to the main frame and universally pivoted to the said side frames and a resilient coupling pivotally joining the lower ends of said link units together.

3. In a crawler type tractor of the type having a main frame, side frames pivotally secured adjacent the rear end of said main frame, endless track belts encircling said side frames, the improvement in having the forward ends of said side frames being solely connected to said main frame through a pair of laterally extending link units, each of said link units being horizontally pivoted to the main frame and universally pivoted to the said side frames and a resilient coupling pivotally joining the said link units together, said coupling extending transversely of the tractor beneath the main frame thereof.

4. A front end suspension for track-laying tractors of the type having a chassis frame and endless track frames pivoted to opposite sides thereof, said suspension including oppositely positioned brackets on the main frame, laterally extending main arcuate levers pivoted to said brackets, secondary links pivoted to said brackets and with the outer ends pivoted to bell cranks which are pivoted between the outer ends of said main arcuate levers, the lower ends of said bell cranks terminating in ball and socket connections secured to the said track frames, the opposite ends of said main arcuate levers being resiliently connected to each other.

5. A front end suspension for track-laying tractors of the type having a chassis frame and endless track frames pivoted to opposite sides thereof, said suspension including oppositely disposed pairs of spaced apart main arcuate levers pivoted to said chassis frame, a second pair of spaced links pivoted to a bracket secured to said chassis frame and extending outwardly therefrom intermediate each of said levers, downwardly and outwardly extending levers pivoted to the ends of both pairs of said spaced levers and links, said extending levers terminating in balls secured in sockets fastened to the upper surfaces of the forward portions of said track frames.

6. A front end suspension for track-laying tractors of the type having a chassis frame and endless track frames pivoted to opposite sides thereof, said suspension including oppositely disposed linkage mechanisms, each mechanism comprising a pair of spaced parallel arcuate levers pivoted to a bracket affixed to the chassis frame, a second pair of spaced parallel links pivoted to the said bracket and extending outwardly intermediate of said first mentioned levers, a downwardly extending offset lever pivoted at one end and at its midportion to the outer ends of both of said pairs of spaced levers and links, a vertically extending bolt in the offset lever, said bolt having a lower ball portion and a socket for said ball secured on the forward upper surface of the pivoted side frame.

7. A front end suspension for track-laying tractors of the type having a chassis frame and endless track frames pivoted to opposite sides thereof, said suspension including oppositely disposed lateral linkage mechanisms joining the forward portions of the chassis frame and the pivoted side frames, each of said linkage mechanisms comprising a lateral bracket secured to the chassis frame and having a pair of spaced arcuate levers pivoted intermediate their ends to the sides of the said bracket, a pair of spaced parallel links pivoted to sides of the outer end portions of the said brackets and lying between the said spaced arcuate levers, the said arcuate levers extending downwardly at both ends beyond the said links; a downwardly and outwardly extending lever pivoted between the outer ends of both the said pairs of levers and links and a ball secured to the underside of the lower end of said lever, said ball being retained within a socket secured to the top of the pivoted track frame; the opposite depending ends of the spaced arcuate levers being secured to a restraining member which is similarly secured to the depending ends of the other linkage mechanism.

JAMES G. HEASLET.